United States Patent [19]
Womble

[11] Patent Number: 5,488,648
[45] Date of Patent: Jan. 30, 1996

[54] BEHAVIOR MONITORING AND ANALYZING SYSTEM FOR STORED PROGRAM CONTROLLED SWITCHING SYSTEM

[75] Inventor: Brian R. Womble, Bedford, Tex.

[73] Assignee: Telefonaktiebolaget L M Ericsson, Stockholm, Sweden

[21] Appl. No.: 107,965

[22] Filed: Aug. 17, 1993

[51] Int. Cl.$^6$ .......................... H04M 1/24; H04M 3/08; H04M 3/22; H04J 1/16

[52] U.S. Cl. .................. 375/13; 375/1; 375/32; 375/34; 370/13

[58] Field of Search .................. 379/1, 9, 10, 11, 379/12, 13, 14, 15, 16, 34, 32; 370/13

[56] References Cited

U.S. PATENT DOCUMENTS

| | | | |
|---|---|---|---|
| 3,917,915 | 11/1975 | Karras | 179/175.2 C |
| 4,022,978 | 5/1977 | Connell et al. | 179/8 A |
| 4,238,649 | 12/1980 | Kemler | 379/14 X |
| 4,311,882 | 1/1982 | Johner et al. | 179/175.2 D |
| 4,680,784 | 7/1987 | Lehnert et al. | 379/11 |
| 4,723,270 | 2/1988 | Okamoto et al. | 379/113 |
| 4,788,718 | 11/1988 | McNabb et al. | 379/113 |
| 4,815,120 | 3/1989 | Kosich | 379/34 |
| 4,924,488 | 5/1990 | Kosich | 379/34 |
| 4,937,862 | 6/1990 | Kosich | 380/3 |
| 4,945,554 | 7/1990 | Krause et al. | 379/10 |
| 4,972,453 | 11/1990 | Daniel, III et al. | 379/10 |
| 5,065,422 | 11/1991 | Ishikawa | 379/11 |
| 5,101,424 | 3/1992 | Clayton et al. | 379/10 |
| 5,241,580 | 8/1993 | Babson, III | 379/10 X |
| 5,276,727 | 1/1994 | Kim et al. | 379/14 X |
| 5,369,680 | 11/1994 | Borbas et al. | 379/13 X |

Primary Examiner—Stephen Chin
Assistant Examiner—Paul Loomis
Attorney, Agent, or Firm—Jenkens & Gilchrist

[57] ABSTRACT

A test and diagnostic tool for stored program controlled telecommunications switching systems captures the occurrence and timing of "events" arising from subscriber actions and from actions which occur within blocks of software in the telecommunication switching system. Data related to the captured events as well as an indication of their location are stored in a large buffer memory. The stored data is then used to analyze the events for the diagnosis and correction of the cause of the fault as well as to recreate the same sequence and timing of events at a later period in order to test the corrections which have been made to ensure that they eliminate the cause of the fault condition.

26 Claims, 4 Drawing Sheets

BEHAVIOR MONITORING AND ANALYZING SYSTEM FOR STORED PROGRAM CONTROLLED SWITCHING SYSTEM

BACKGROUND OF THE INVENTION

1. Field of the Invention

The invention relates to stored program controlled telecommunications switching systems, and more particularly, to a design and diagnostic tool for such systems.

2. History of the Related Art

Digital stored program controlled telecommunications switching exchanges are highly complex systems which contain numerous physical components all controlled by a computer containing many different interacting blocks of software. In order to process a telephone call within the system, it is necessary that these software blocks each perform their respective jobs of analysis and control in an interactive and virtually flawless fashion. Data are constantly being exchanged between different software blocks via software signals. The end result must be the accurate and timely processing of numerous signals to effect the control of various hardware components and set up the communication connections.

From time to time during the operation of a telecommunications switching exchange, particularly during the initial operation of new or upgraded software, various faults may occur in the switch leading to so-called "hung" devices or software elements. Such software faults occur because of an inability of the software within one or more of the blocks to process a particular event or sequence of events within the system. When a fault occurs, it is often necessary to either partially or completely restart the software block, or even the entire system, in order to eliminate the hung element and return the system to a state which is recognizable by the software for proper call processing.

Telecommunications switching exchanges are programmed to be responsive to the occurrence of various "events" within the system such as, for example, a subscriber going off-hook, the dialing of digits by a subscriber, a switch hook flash, or a subscriber going back on-hook. The occurrence of any of these, and other possible events, results in certain behavior within the software of the switching system as well as the assignment and deassignment of certain physical elements to effect completion of a call. When a software event occurs and results in a hung device or hung software, it is very important to be able to trace the sequence of events leading up to the hung condition in order to diagnose and eliminate the cause of the fault. Moreover, after corrections have been made to the software, it is also necessary to be able to recreate the order, sequence, and timing of the specific events which preceded the fault in order to ensure that the corrections work and to prevent recurrence of the fault.

In the past, one method which has been used to verify the correct operation of a telecommunication exchange is to obtain low-level printouts of all the program instructions which occurred in a particular call sequence. Such printouts or "tracings" are very detailed and are extremely difficult to understand even by trained technicians. Tracings are not an efficient solution to software fault location and correction.

Another method of verifying correct operation within a switching system is to actually perform the desired call and to observe the reactions of the exchange in completion of the call. This, however, is primarily a go/no-go determination and does not give the operator a detailed look at the actual sequence of computer instructions executed within the exchange in order to complete the call.

It would be highly desirable to have a method and tool by which software signals, data, order of execution, timing, relationships between parameters and other information from within the switch software or other situations within the telecommunications environment could be selected and collected to monitor the sequence of events leading up to the occurrence of a fault condition, and then used to reconstruct the same sequence of events to test corrections which are made to prevent recurrence of the fault. The present invention provides such a system and method.

SUMMARY OF THE INVENTION

In one aspect, the present invention includes a system for selectively monitoring the occurrence of certain events within the software and then storing an indication of those events in memory. The stored events are used to control a traffic generator which recreates the same events on a subsequent occasion to test the performance of the switch.

In another aspect, the present invention is a method of monitoring and recording certain situations within a telecommunication switching system having functional blocks of software. The method selects, via console commands, parameters associated with events desired to be monitored. The functional blocks of software within the telecommunication switching system are modified to provide software signals reporting the detected parameters. Parameters within the telecommunication switching system relating to fault-causing events are then detected. The detected parameters are compared with the selected parameters to determine whether the event causing the signals is an event desired to be monitored. Finally, the detected parameters are recorded in response to a determination that the event is an event desired to be monitored.

The method may also include analyzing the recorded parameters by marking each of the recorded parameters with an indication of its time of occurrence, downloading the recorded event parameters into a computer having a monitor, reconstructing the sequence of events leading to the occurrence of the fault within the telecommunication switching system by utilizing the time indications, and then displaying the sequence of events on the monitor of the computer for analyzing the sequence.

In still another aspect, the present invention is a system for testing a telecommunication switching system. The testing system includes means for detecting parameters within the telecommunication switching system relating to fault-causing events and a recording device for recording the detected parameters. The system also has a signal generator for generating simulated telephone signals containing the recorded parameters, and means for transmitting the simulated telephone signals through the telecommunication switching system in order to test that system.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

In general, the system of the present invention employs the technique of capturing the occurrence and timing of "events" arising from subscriber actions and from actions which occur within blocks of software in the telecommunication exchange. Data related to the captured events as well as an indication of their location are stored in a large buffer memory. The stored data is then used to analyze the events for the diagnosis and correction of the cause of the fault as well as to recreate the same sequence and timing of events at a later period in order to test the corrections which have been made to ensure that they eliminate the cause of the fault condition.

Figure 1:
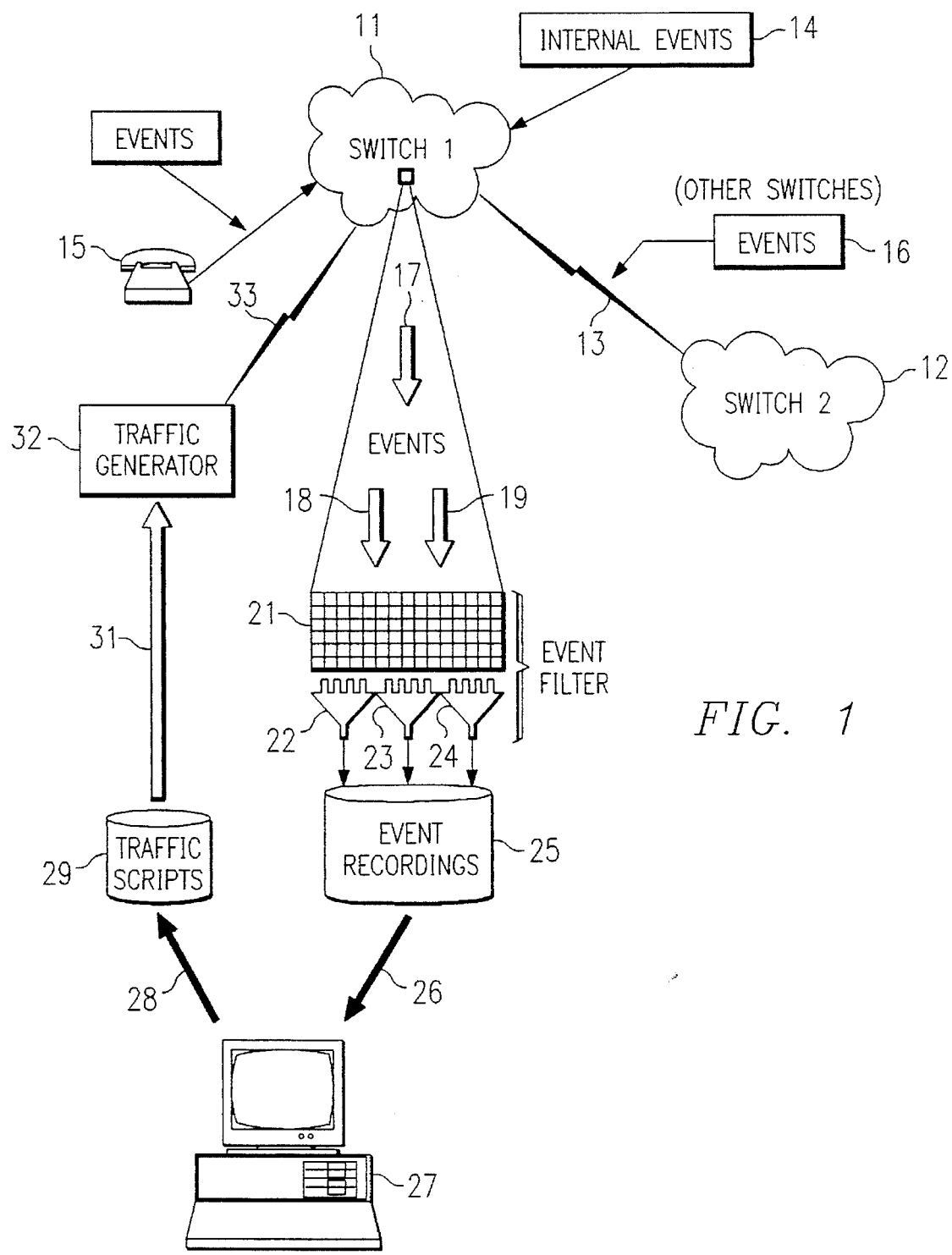
FIG. 1 is an illustrative diagram illustrating the use of the system of the present invention.

Referring first to FIG. 1, there is shown an illustrative diagram depicting an overall implementation of the system of the present invention within a telecommunications network. A first stored program controlled telecommunication switching system ("switch") 11 is connected to a second switching system 12 by means of interoffice trunks 13. The switch 11 is subject to a continuing series of events which can either be external events or internal events. External events 14 may include those created by the actions of subscribers with their telephone instruments 15 or other switch based events 16 such as calls from other exchanges. Exchange 11 is also subjected to internal events which arise as a result of software signals being exchanged between the various software blocks as well as the timing and nature of those internal software actions. The system of the present invention is coupled to the switch 11 so that certain events 17–19, such as all events occurring within the switch and relating to a particular subscriber or a particular interoffice trunk, are directed to an event filter 21 which selectively examines each of the events to determine which ones of them are of interest. The event filter 21 is selectively programmable by the user so that filter elements 22–24 eliminate those events which are of no interest for particular analyses and pass those which are of interest to a memory 25 for recording. The events recorded in the memory 25 are passed at 26 to a personal computer 27 within which the events may be also stored, analyzed, and viewed by means of graphical interfaces for the purpose of diagnosing and correcting errors within the software or hardware of the exchange.

Once corrections have been made in the form of, for example, changes to the software of the switch 11, in order to correct a software error which has been producing a fault under certain conditions, the PC 27 includes the capability of passing the stored events 28 through traffic script software to reassemble those events in a form which resembles call traffic. Traffic simulating signals 31 are passed to a traffic generator 32 which generates a sequence of events, and generator signals 33 are coupled to the switch 11 to simulate the occurrence of telephone traffic. The traffic generator 32 enables the simulation of telephone calls containing the same sequence and timing of events which previously resulted in the faults within the switch 11. This enables the operator of the system to quickly and easily check whether or not the corrections made to the software/hardware have eliminated the possible future occurrence of the same fault.

Figure 2:
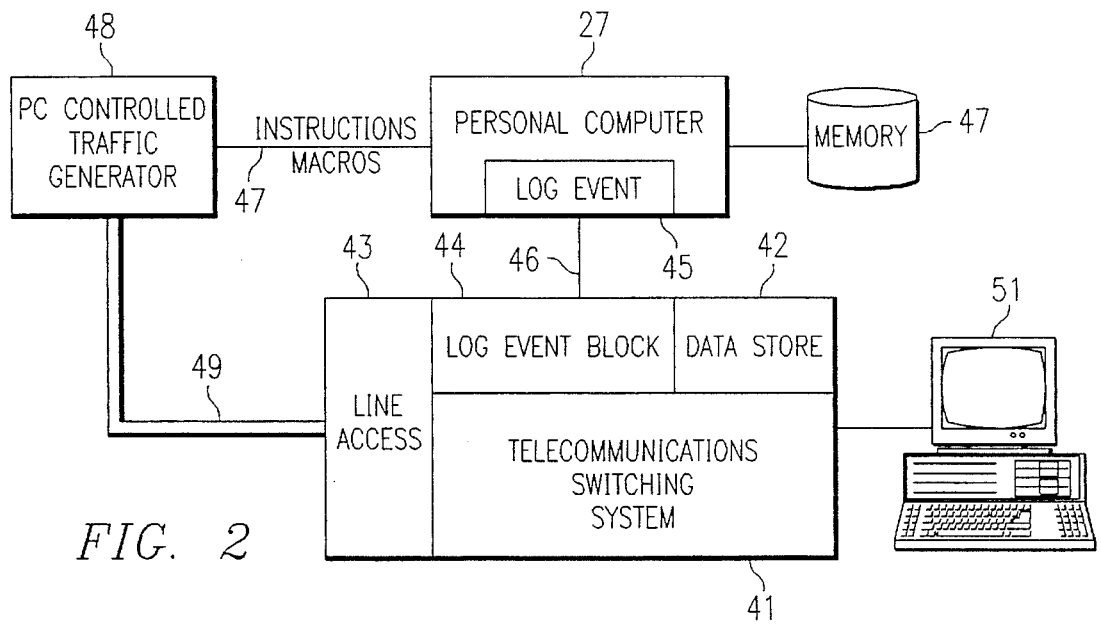
FIG. 2 is a block diagram illustrating certain components of the system of the present invention.

Referring next to FIG. 2, there is shown a block diagram of a telecommunication switching system within which the diagnostic system of the present invention has been incorporated. A telecommunication switching system 41 may be of the type manufactured by the assignee of the present application under the designation AXE-10, an earlier version of which was described in an article by Mat Eklund et al. entitled "AXE10 System Description", published in Ericsson Review, No. 2, 1976, which is hereby incorporated by reference. The switching system 41 includes a data storage memory 42 and line access block 43. The data store 42 comprises an event-recording buffer and a large memory area within which the system may store both permanent and temporary information including certain data used by the system of the present invention. The line access 43 of the system 41 includes hardware such as subscriber line interface circuitry (SLIC) as well as software for controlling that circuitry and enabling subscriber telephones to obtain access to the switch 41. Also installed within the telecommunication switching system 41 is a software block 44 which is used in the implementation of the system of the present invention as will be further described below. This block is referred to as the "LOGEVENT" software block 44. The LOGEVENT block 44 within the switching system 41 is connected to a LOGEVENT block 45 located within a personal computer 27 by means of a data communication link 46. The personal computer 27 also includes a memory 47 as well as conventional operating software and other graphical and man-machine interface software as will be further described below. The personal computer 27 is linked by a data line to a conventional PC-controlled traffic generator 48. The personal computer 27 can formulate a series of instruction macros which control the traffic generator 48 to generate simulated telecommunications traffic on a plurality of lines 49 connected to the line access block 43 of the telecommunication switch 41.

The LOGEVENT block 44 is included within the control system software of the telecommunication switching system 41. The selection of which subscribers are to be monitored for the occurrence of events is set up through man-machine language commands to the telecommunication switching system by means of a control terminal 51. The LOGEVENT block 44 is programmed by means of the personal computer 27 as an I/O terminal to specify the particular events, related to the specified subscriber lines, which are to be collected and stored by the system. A mapping function in the LOGEVENT software 44 stores criteria identifying an event if it matches a pre-specified subscriber pointer. The events are stored in a buffer memory within the data store 42 and may be printed out by means of a command through the terminal 51. In addition to the recording of the events within the data store 42, each event may be sent as it occurs to the personal computer 27 via the data link 46. The personal computer LOGEVENT block 45 receives the information and records the events in the memory 47 as well as graphically displays the information on the monitor of the personal computer 27. The personal computer 27 can also be used to replay and analyze the sequence of events to determine the nature of what occurred and to diagnose the reasons for the occurrence of faults. In addition, an event file can also be created within the PC by a technician interacting directly with the graphical objects. Thus, test instructions can be created for the traffic generator 48 with much greater efficiency and speed on a one-by-one basis.

Figure 3:
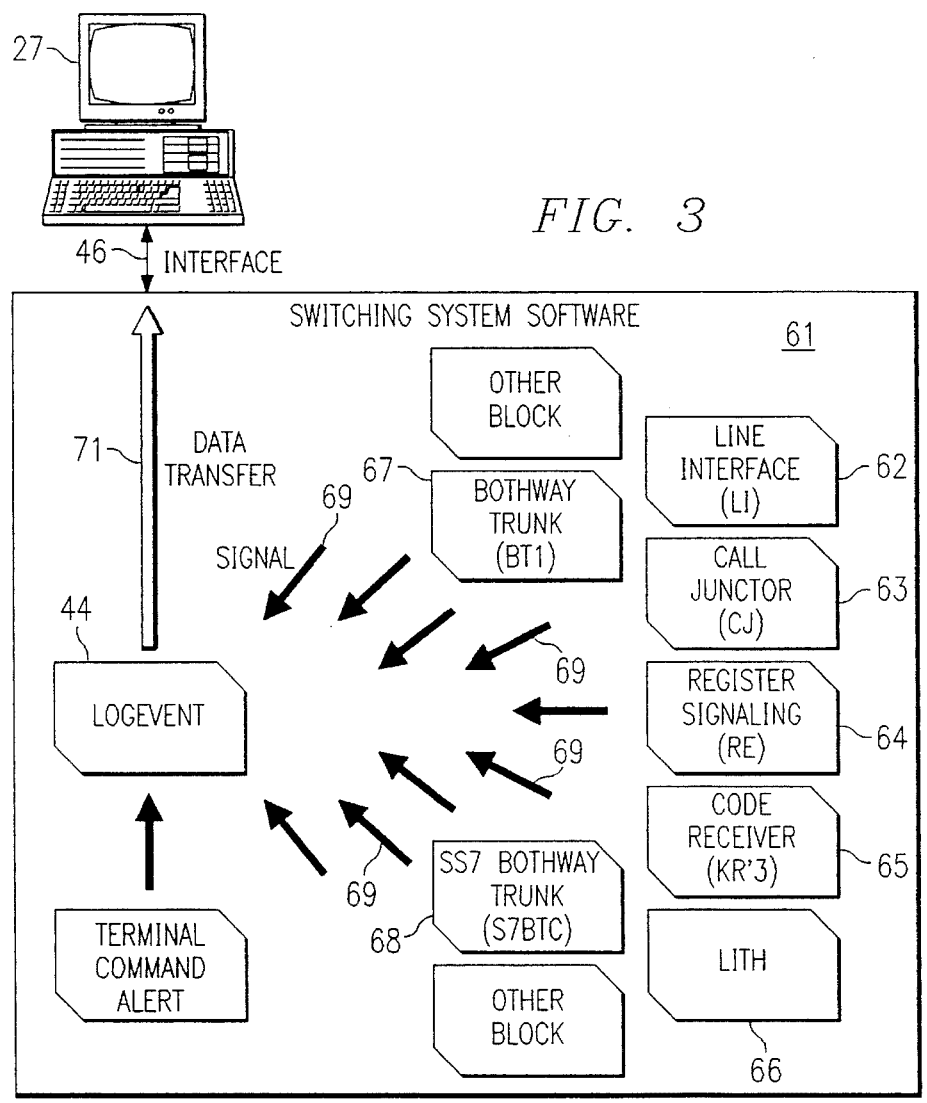
FIG. 3 is a block diagram illustrating the collection of data within switching system software in accordance with the present invention.

Referring next to FIG. 3, there is shown a diagram which illustrates the manner in which information related to events occurring within the switching system software is directed to the LOGEVENT block 44 of the present invention. The data processing software 61 of the telecommunication switching system 41 includes numerous call processing function blocks. These include a plurality of line interface (LI) blocks 62, call junctor (CJ) blocks 63, register signaling (RE) blocks 64, code receiver (KR) blocks 65 and line interface traffic handling (LITH) blocks 66. In addition, both way trunks 9BT) 67 and signaling system no. 7 both way trunks (S7BTC) 68 as well as numerous other blocks provide software signals for communication among one another as well as software signals 69 which are selectively directed toward the LOGEVENT block 44 for the collection of data related to the occurrence of software events within the blocks of the data processing software 61. Conventional software "patches" are added to each software module in the system to direct signals related to events to the LOGEVENT block 44. As these data are selectively collected, they are transferred at 71 to both the data store 42 within the telecommunication switching system, as illustrated in FIG. 2, as well as to the PC 27 via the data communication interface 46.

Figure 4:
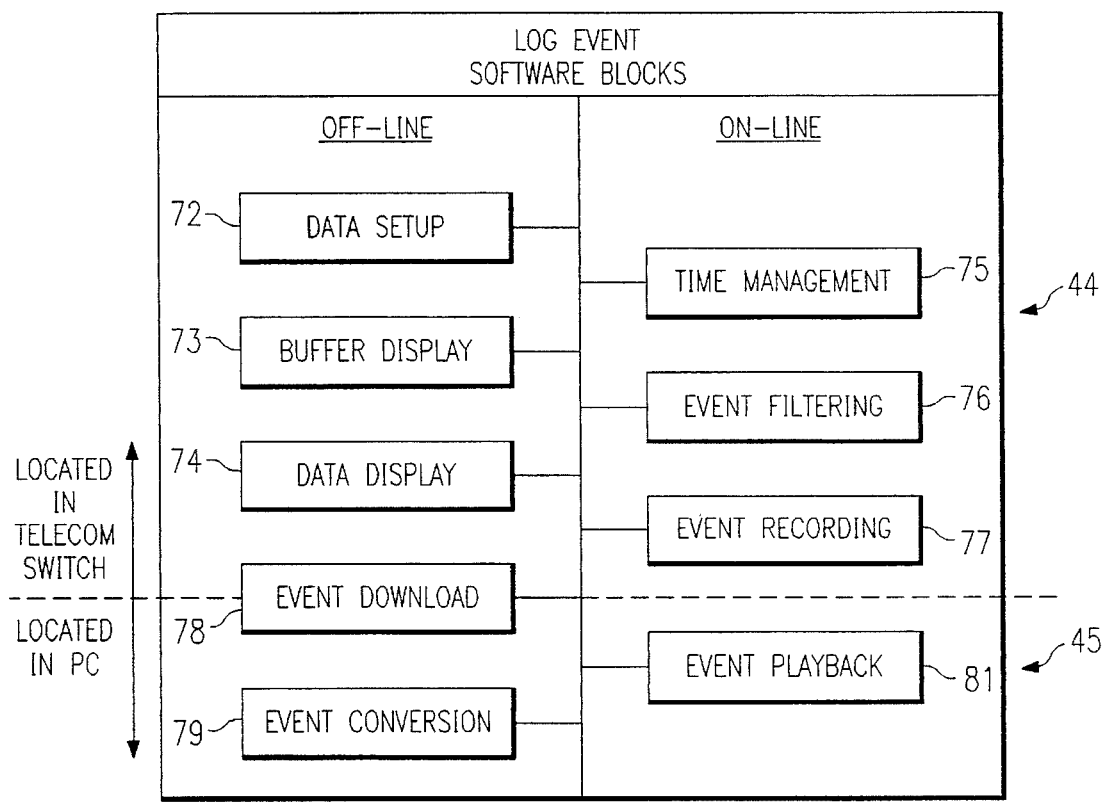
FIG. 4 is a block diagram illustrating certain elements of the software within the system of the present invention.

Referring next to FIG. 4, there is shown an illustrative block diagram of the components comprising the LOGEVENT software blocks 44 and 45 within the telecommunication switching system 41 and the personal computer 27, respectively. Some of these block function off-line while others work on-line in real time. Within the telecommunication switch the LOGEVENT block 44 includes a data setup block 72 which is used for command entry including informing the system of event definitions, as well as device recording selections and the like in order to initially establish the parameters which will be used in the collection of data from within the telecommunication switching system 41. A buffer display block 73 is used to command the printout of the event-recording buffer within the data store 42 of the telecommunication switching system 41. A data display block 74 commands the printout of event definitions and recording selections and other data related to the collection parameters used by the system. Also within the block 44 is a time management component 75 which creates timing signals and maintains relative timing counters which are used in the printout and event playback to analyze the sequence and timing of various events and determine their relevance to the analysis of the data related to the events. An event filtering block 76 is included wherein events are discriminated from one another based upon data setup, dynamic allocation or global switches within the system. It is the event filtering block 76 which selectively discriminates between the large number of events which are occurring within the switch and those events which are of interest in the particular analysis being performed by the system of the present invention. An event-recording block 77 saves and stores the relative time, event number, device number, associated device number, and up to twenty data words with respect to each particular event selected for recording and filtered by the event filtering block 76. Located within both the telecommunication switching system 41 and the personal computer 27 are an event download block 78 which is used to capture the contents of the event-recording buffer within the data storage 42 and transfer it to the memory 47 associated with the PC 27. Also within the personal computer 27 is an event conversion block 79 which includes software for rules-based conversion of an events log into macros which can be played back via the traffic generator system to generate simulated calls into the access of the telecommunication switching system. Also located within the PC 27 is an event playback block 81 which contains macros generated from prior event recordings enabling the creation of simulated events.

Referring to FIGS. 1–4, the system of the present invention is implemented, in part, by means of the LOGEVENT block 44 located within the telecommunication switching system 41. Communications of information to block 44 is accomplished by patching existing code blocks within the telecommunication switching system software 61 so that as the events which are of interest occur, a software signal 69 (FIG. 3) is sent to the LOGEVENT block 44. Events can be added to the LOGEVENT block 44 dynamically so that a user can create events and define them within the block for any specific purpose. Each of the software signals 69 contains an identifying label, or event number, and certain predetermined information which is to be stored along with the other indicia of the event in the event-recording data buffer within the data store 42. In one embodiment, the data buffer is implemented as a "circular buffer" which prevents the overflow of data since storage starts again at the beginning of the data file when normally an overflow condition would be occurring within the store. Additional information which is stored with the indicia recording the event is the device number or identification number from the reporting software block sending the signal. By using the event number, the device number, and the reporting block identification number each event which is reported to the LOGEVENT block 44 is screened to determine if the event and the device are among those "scheduled" for recording. That is, the software signals sent to the block can be selectively filtered in this way to ensure that only particular events relating to particular devices or subscribers are recorded. The actual screening of the events is accomplished by using a hashing algorithm which marks indicia into an array or hash table. Each event which is received is processed with a conventional hashing algorithm, and the results are then compared with the data within the hash table. Only if the entry is found in the hash table is the event recorded.

Other elements within the telecommunication switching system 41 are dynamically allocated into a second hash table. For example, each subscriber is associated one-to-one with a software record and a line interface (LI) block. This pair can be referred to as an "LI-individual". When a call is initiated, a call junctor (CJ) individual is "seized", however, this individual device is not associated one-to-one with the subscriber and is actually selected from an idle list so its identity can be any one of all the possible values for individual call junctors. If the user of the present system desires to record further information using the call junctor individual data, an event would be created which reports the association of the newly allocated call junctor element to the line interface element which originated the call. In this fashion, an entire call sequence can be traced through the switching system 41. This technique effectively limits the amount of information presented when a signal trace is set on a software block within an exchange and enables that information to be used in a practical sense for analyzing the occurrence of events within the exchange.

With the system of the present invention, all desired event recordings are first scheduled by means of a command to the LOGEVENT block 44 through the exchange interface terminal 51 and only those events which are pre-programmed are placed in the event buffer within the data store 42. The ability exists, of course, to capture all events by using the command interface from the terminal 51 to set the device parameters to "all" so that all events of a particular type will be recorded, or all events of any type will be recorded by the system.

In a typical call sequence employing the system of the present invention, the telecommunication switching system operator initializes the data structures within the LOGEVENT software block 44 by means of the terminal 51. This command sets up a block-event-device combination which is to be recorded by the system of the present invention. When a subscriber makes a call as normal, i.e., an A subscriber goes off-hook, this event is relayed via a software signal to the LOGEVENT software block 44. The LOGEVENT block checks its internal hash table to see if this event is to be recorded and, if so, it is stored in the event buffer within the data store 42 for later retrieval. The stored items related to an event include an event number, a time stamp, and up to twenty data elements which pertain to the event.

After the A subscriber has gone off-hook, digits are dialed, and for each digit, an event is relayed to the LOGEVENT software block 44 which results in the recording of each of the numbers which were dialed along with the relative time between the dialing of each digit indicated via the time stamp. After the completion of dialing, subsequent software blocks within the switching system 41 are identified by signals which pass back to the LOGEVENT software block 44, the dynamic individual numbers as they are allocated. When the call reaches the called subscriber (B subscriber), the events of that subscriber, e.g., off-hook, flash, on-hook, etc. are also recorded by means of software signals sent from the appropriate functional software blocks to the LOGEVENT software block 44. As each of the register signalling components of the call are released, i.e., after the speech path of the call has been set up, the software switching control is no longer needed, this information is also relayed to the LOGEVENT software block 44 so that those components will not be recorded upon if used in a subsequent call. The LOGEVENT block 44 removes the markings from its internal hash tables immediately upon receiving the "release" signals.

When a final on-hook event signal is received from the B subscriber, the LOGEVENT block 44 records this event and removes from the hash tables the markings which would cause the events related to the B subscriber to be further recorded. The switching system operator determines whether or not all of the events of interest were complete and stops the recording and orders a printout to observe the sequence, timing, etc., of all of the events which have been recorded. If the sequence of events shown in the printout exhibits abnormal behavior on the part of the switching system, or if the operator just desires to replay the call exactly as it originally occurred, the events are then downloaded to the PC 27 and converted into test script which is played back on the traffic generator device 48 to resimulate the occurrence of the same events and determine whether or not the same the behavior is exhibited in the switch.

The system of the present invention also includes the capability of reporting each event on a real time basis to a graphical interface within the personal computer 27 so that as each event occurs, the display is updated with the most current state of each subscriber in a call. Such events are displayed by means of icons forming part of a graphical user interface which efficiently convey information about events which are occurring within the telecommunication switching exchange 41 to an observer. For example, if a subscriber lifts the handset from a telephone which is scheduled for recording by the present system, the graphical interface may change from an icon which pictures a telephone with a handset in a normal on-hook position to a telephone with a handset suspended above the telephone indicating that the subscriber has indeed just gone off-hook. Such icons may be created by the user using conventional well-known software tools on the personal computer 27 and will be dynamically associated with the events by the use of a configuration file.

The capability of capturing events from within the telecommunication switching exchange 41 results in the ability to replay the events which were captured and simulate the captured call sequence in a very accurate fashion. The personal computer 27 translates the log of captured events into automated test instructions by means of test macros which are directed to the traffic generator 48 to recreate a simulated call to the system.

Data within the LOGEVENT block portions of the present invention is handled as set forth below. An important component of the present system is the "RECORDING BUFFER FILE" which is implemented as a circular buffer within the data store 42 of the telecommunication switching system 41. It is played back and recorded to as a first-in, first-out (FIFO) data file to ensure reliability and completeness of the data recorded therein. The structure thereof is set forth as follows in a modified form of programming language for exchanges (PLEX) language:

```
RECORD REPORTBUFFER;
    VARIABLE INFOR (32) 16 DS;
END RECORD;
POINTER RPOINTER (REPORTBUFFER);
```

© Telefonaktiebolaget L M Ericsson 1993

Another file which is used each time event is recorded and played back is the event list file. The data contained in this file is set by command and a description and function for each variable is set forth below:

```
RECORD EVENT;
    VARIABLE EVENTBRIEF            16DS;
    VARIABLE ALLFLAG               16DS;
    VARIABLE ASSOCIATEDEVENT       16DS;
    VARIABLE STARTTRIG             16DS;
    VARIABLE TOTALDATA             16DS;
    STRING VARIABLE BLOCKNAME       7DS;
    STRING VARIABLE STRINGOUT      31DS;
END RECORD;
POINTER EVENTPOINTER(EVENT);
```

© Telefonaktiebolaget L M Ericsson 1993
Each of the variables in the above file are defined as follows:
EVENTBREF - Event Block Reference. This is the block reference number related to the block which the event being recorded originates from. The block reference number is the telecommunication switch software marshal related number.
ALLFLAG - This flag is checked when recording is active, but not started. If this event occurs, and the ALLFLAG is set to TRUE, this event is recorded.
ASSOCIATEDEVENT - This optionally set to an event which will be "logged" into the hash table if this event is received. This gives the tool and ability to dynamically add new event-device pairs to the recording has table.
STARTTRIG - This flag is checked when recording is active, but not started. If this event occurs, the STARTTRIG is set to TRUE, regular recording is started.
STOPTRIG - This flag is checked when recording is active and started. If this event occurs, and STOPTRIG is set to TRUE, all recording is stopped.
TOTALDATA - Used for recording and printout, tells how many data are used from incoming event signal, or how many data are stored in event recording buffer.
BLOCKNAME - The name of the software block being recorded.
STRINGOUT - Descriptive string used for printout of the recorded event.

The system of the present invention includes as part of the LOGEVENT block within the PC, a pc-based tool that uses printouts, consisting of events, from the LOGEVENT block in the switching system to create executable AUTOSIS Test Instruction (TI). The events are converted to PCSLI primitives or macros. The TI is run by AUTOSIS to reproduce the events recorded by the LOGEVENT block.

This tool is implemented so that the input to the program is a Test Specification (T$) and a set of FIOL log files. The program also requires a RULE file, and a file containing PCSLI macros. Input and output files are specified in either a menu system or at the DOS command line. One characteristic of the test specification is that each test is identified with a "LOGEVENT" label. The syntax of the LOGEVENT label is as follows:

```
:p.LGEVENT ID = <label>
An illustrative example of a LOGEVENT label in the system is:
    :h3.Initial load restart with time measurement
    :p.LGEVENT ID - Initload
        Separate a SP link
    :
```

All test cases must have a LGEVENT label in order for the program to find it during the creation of the test instruction. The label must be unique in the test specification, and it must be placed on the very next line following the heading. The test specification is parsed after all FIOL log files, or event logs, are parsed. The event log files contain the event printouts. Events are initiated, for example, with the "ELLLI ID=x;" command. Switching system commands sent between the "ELLLI" command and the "ELLLP" command are simply copied to the output file, i.e., the test instruction.

The configuration file consists of keywords, e.g. SUB, and string, e.g. "LI-I" and comments. Comments start with an exclamation mark and end at the end of the line.

This subscriber section describes all subscribers known by the LOGEVENT program. The maximum number of subscribers is 8. Each subscriber has four attributes. These are:

| | |
|---|---|
| IND | Individual, device (e.g. "LI-1") |
| SUB | Subscriber id ("A" through "H") |
| SNB | Subscriber phone number (e.g. "2149970000") |
| CIN | Control Individual (PCSLI) |

A subscriber must have all four attributes specified (IND, SUB, SNB and CIN) and there are no default values. A missing attribute will result in an error during the parsing of the configuration file. Each subscriber in this section starts with the keyword SUBSCRIBER and ends with ENDSUBSCRIBER, as set forth below in TABLE II.

TABLE I

FIOL Log File of Events

```
<ELLLI: ID=CallA;
    EXECUTED
<STDEP: DEV=LI-1;
    EXECUTED
<ELLLP;
```

EVENT LOGGING REPORT
ID CallA STARTED XX/XX/XX Time: XX:XX

| COUNT TIMER | NUMBER EVENT | INDIVIDUAL DEVICE | EVENT DESCRIPTION | ASSOCIATED DEVICE |
|---|---|---|---|---|
| 000010, | 001, | LI-1, | OFFHOOK; | |
| 000020, | 002, | LI-1, | CJ SEIZED INCOMING, | CJ-2048; |
| 000030, | 003, | CJ-2048, | CJ SEIZED RE, | RE-503; |
| 000530, H'0003; | 004, | LI-1, | DIGIT DIALED, | , |
| 000560, H'0004; | 004, | LI-1, | DIGIT DIALED, | , |
| : : END | | | | |

The events are next converted to PCSLI primitives or macros according the rules in the Rule File. The log files are parsed before the test specification is parsed. Each converted test case is placed in a temporary file, which is later used when the test specification is parsed.

The configuration files are used to set up the LOGEVENT program to suit the needs of the user. Preferably, it split into 3 sections, the subscriber section, the event-rule section, and the PCSLI macro section. These sections are described in further detail below. The sections are allowed in any order.

TABLE II

SUBSCRIBER SECTION OF CONFIGURATION FILE

```
SUBSCRIBER INFV "LI-1"        ! Device
    SUB "A"                    ! ID
    SNG "2149070000"           ! Number
    CIN "1"                    ! Control Individual
ENDSUBSCRIBER
SUBSCRIBER INDV "LI-2"
    SUB "B"
    SNG "2149075445"
    CIN "5"
ENDSUBSCRIBER
    :
    :
```

The event-rule section consists of a list of events and their associated attributes. Each event has seven attributes as follows:

TABLE III

EVENT-RULE SECTION OF CONFIGURATION FILE

| | |
|---|---|
| NO | This is the event number which must be unique. |
| TITLE | The title is not used by this program but by another module in the LGEVENT system. |
| DURATION | Average time in milliseconds for the event to execute. This attribute is not used by this program but by another module. |
| ICONFILE | File name (no path, no extension) of the ICON description file. This attribute is also not used by this program but by another module. |
| DATA | Number of data items expected by the event. This attribute is also not used by this program but by another module. |
| RULE | Rule string containing strings and keywords to be converted into an AUTOSIS test instruction. The keywords are described below. |
| DESCR | A verbal string containing strings and keywords to be converted into a comment, which is placed before the converted rule in the test instruction. |

```
EVENT NO "001"
    TITLE "Offhook"
    DURATION "30"
    ICONFILE "offhook"
    DATA "0"
    RULE "OFF-% CIN"
    DESCR "% SUB goes Offhook"
ENDEVENT
EVENT NO "002"
    TITLE "Dialing a digit"
    DURATION "30"
    ICONFILE "dial"
    DATA "3"
    RULE "Off-% CIN"
    DESCR "% SUB dials % DATA1"
ENDEVENT
    :
    :
```

© Telefonaktiebolaget L M Ericsson 1993

There are a number of keywords used in the event-rule of the configuration file as follows:

| | |
|---|---|
| % TIMER | The timer column in the event logging report. |
| % INDV | The individual column in the event logging report. |
| % DATAx | % DATA1–% DATA20. The data (two lines) associated with some of the events. % DATA1 is the first blank-separated token, % DATA2 the second, and so on. DATA11 is the first token on the second data line, for example:<br>:<br>000530, 004, LI-1, DIGIT DIALED, ,<br>% DATA1, % DATA2, % DATA3,<br>. . . % DATA10,<br>% DATA11, % DATA12, % DATA13,<br>. . . % DATA20;<br>: |
| % SUB | The subscriber identity associated with the INDV attribute specified in the subscriber section of the configuration file. The INDV attribute is picked from the INDV column in the event logging report. E.g. in TABLE II the % SUB is substituted with "A" for INDV "LI-1" and with "B" for INDV "LI-2". |
| % SNB | The subscriber number associated with the INDV attribute. See % SUB above. E.g. in TABLE II the % SNB is substituted with "214907000" for INDV "LI-1" and with "2139075445" for INDV "LI-2". |
| % CIN | The control individual associated with the INDV attribute. See % SUB above. E.g. in TABLE II the % CIN is substituted with "1" for INDV "LI-1" and with "5" for INDV "LI-2". |

All attributes (NO, TITLE, ICONFILE, DURATION, DATA, RULE and DESCR) must be specified. If an event produces no data specify DATA "0". If an event does not need a description then specify DESCR "". each event in this event-rule section starts with the keyword EVENT and ends with ENDEVENT.

The amount of events is assumed to be fairly small (<100), therefore the rule file is read once, and it is kept in memory during program execution.

The PCSLI macro section of the configuration file contains the PCSLI macros to be used with the created test instruction. These macros are placed in a procedure called "macros" and it is called from the global prepare sector in the test instruction. By using macros it is possible to make the rules, as illustrated in TABLE III, shorter and more readable.

The PCSLI macro section starts with the keyword PCSLI and ends with ENDPCSLI. This section does not have any keywords. All strings between the PCSLI and ENDPCSLI are simply copied to the test instruction as shown in TABLE IV. See example below.

TABLE IV

PCSLI MACRO SECTION OF CONFIGURATION FILE

```
PCSLI
"<<DEF ACBCALL SPEECH-% 3–% 2 cin=% 1 off idt pbd-% 2,"
"<        ITC-3 pbd-2! RDT on P6,"
"<        cin=% 2 on cin=% 3 on P2,"
"<        cin=% 1 irg off RING-% 1–% 2,"
"<        off-% 2 P2 tct-% 1–% 2 on –% 2 on –% 1;"
```

TABLE IV-continued

PCSLI MACRO SECTION OF CONFIGURATION FILE

```
"      (Alert tone - A1 sub - B1 sub, insert correct values)"
"<DEF ALERTT ITC-X% 1 ITC-X-% 2"
"<DEF ANSWER cin=% 1 off"
     :
     :
ENDPCSLI
```

© Telefonaktiebolaget L M Ericsson 1993

An AUTOSIS test instruction is created as the output file as follows. The log files (event logs) are parsed first and temporary files are created for each test case. The test specification is then parsed. Most lines are just copied to the output file (the test instruction). Certain EDML tags are changed, e.g. "docno". When an LGEVENT label is encountered, the test case description is first copied to the test instruction, and then its associated temporary file containing the PCSLI instructions (created when the log files were parsed) is appended after the test case description. If an LGEVENT label does not have a corresponding test case in the log files, an error message is issued. This program also tries to reproduce the correct timing of the events by reading the TIMER column in the event logging report illustrated in TABLE I, and issues PAUSEs before each PCSLI macro. However, it is impossible to reconstruct the exact timing since the exact execution time AUTOSIS and PCSLI instructions is not known. Therefore only timing differences greater than an approximate value, e.g. 500 ms, can be allowed for. All created test case are automatic test cases (TCAUTO).

This portion of the LOGEVENT program is invoked from the DOS prompt. If no parameters are supplied, a menu system will prompt the user for the input to the program. Command line parameter switches can appear anywhere on the command line as long as they are separated by spaces. Switches consists of a hyphen, a letter and a plus or minus sign to turn the switch on or off (some switches are followed by a string instead of the plus and minus sign) and most switches have a default setting. It is only necessary to supply a switch if the default setting is not satisfactory. Examples are set forth below.

Ipath

Specifies the path and file name for the created test instruction. If the switch is omitted, the test instruction will get the same file name as the test specification and extension ". TI", as follows:

Ic: sus500. ti

Spath

Specifies the path and file name of the test specification to be used, for example:

Sc: sus500. ts

Lpath

Specifies the path for where the log files are located. Multiple log files are specified by using this switch repeatedly, or by using a file match pattern, for example:

Lsus200. log -Lsus201. log -Lchs314. log

Lsus *. log

Cpath

Specifies the path for LOGEVENT configuration file to be used. If omitted, LOGEVENT will search for a file name "LOGEVENT. CNF" first in current directory, and if it is not found there it will search for the same file in the directory as "LOGEVENT. EXE" is located, for example:

Cc: ÉlgeventÉmycnf. cnf

In batch mode no keyboard attention is needed. This switch requires that the I, S, and L switches are supplied in order to skip the input data menu. If any of those switches are missing, the input menu is displayed, but all other keyboard intervention is suppressed.

A menu system will prompt the user for the input files (if they were not all specified as command line parameters), and will then display some windows that informs the user of the progress of the conversion.

Figure 5:
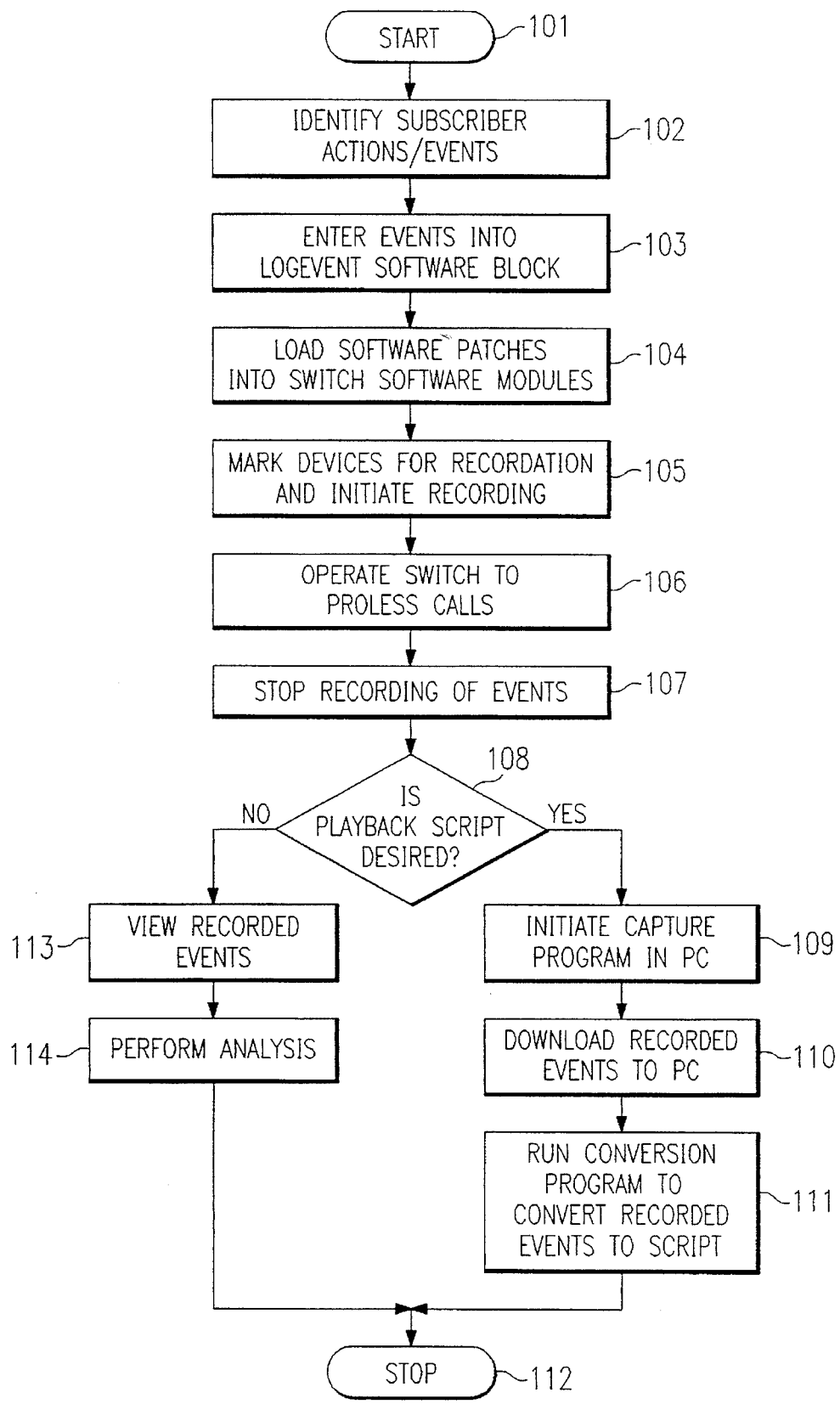
FIG. 5 is a flow chart illustrating certain procedures employed in the system of the present invention.

Referring next to FIG. 5, there is shown a flow chart for the initial conditioning and use of the system in one aspect of the present invention. First, the system starts at 101 and moves to 102 at which time the operator of the system identifies the subscriber action or events to be recorded i.e., a plan is made for use of the system. At 103, the operator enters any events into the software block via commands if those events do not already exist. At 104, the software "patches" are prepared which are loaded into the telecommunication switching system software blocks and are used to report the particular events by sending a signal to the LOGEVENT block upon the occurrence of any of the preselected events within the software blocks of the system. At 105, specific devices are marked for recording via command. The recording is initiated by means of a particular command, e.g. , ELLI. At 106, the telecommunication switching system is operated either by the receipt of actual calls or by the use of a telephone traffic generator and events are caused to occur within the switch. At 107, after completion of the desired testing, the recording is halted by means of a command such as ELLE. Next, at 108, it is determined whether or not the recording is to be used to create a playback script and if so, the system moves to 109 at which the capture program on the PC is initialized and the recorded events downloaded to the PC at 110. Next, at 111, a conversion program is run to convert the recorded events to the playback script and at 112, the system ends. If, at 108, it was not desired to create a playback script, the system moves to 113 where the events recorded are viewed by means of a particular command, such as ELLT and at 114, an analysis is performed on the recorded events. The system stops at 112.

Figure 6:
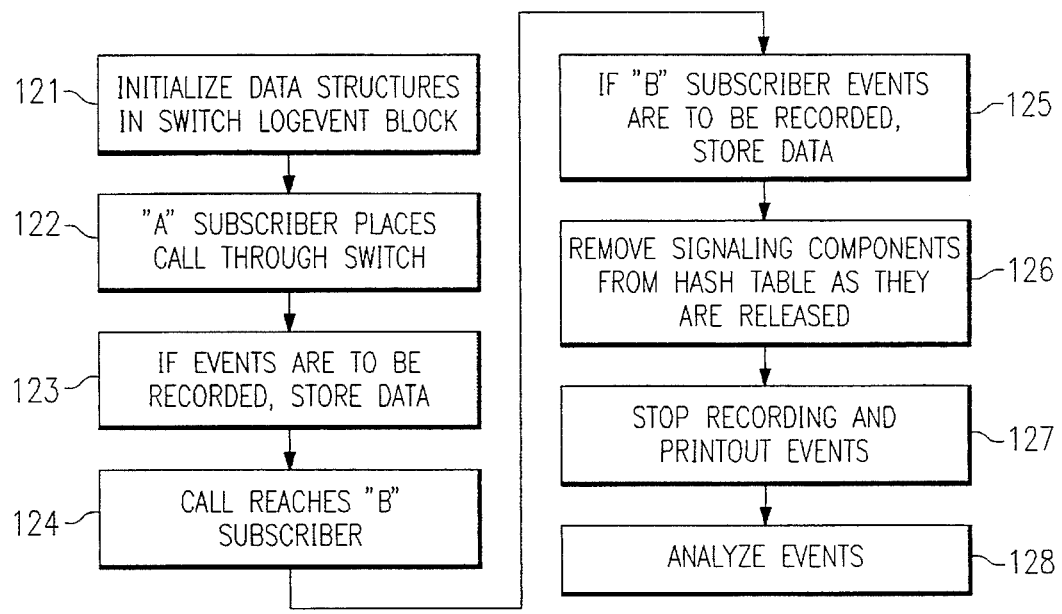
FIG. 6 is a flow chart illustrating the LOGEVENT performance during a typical call sequence in the preferred embodiment of the present invention.

As an illustration of the LOGEVENT performance during a typical call sequence the flow chart of FIG. 6 is provided. There it can be seen at 121 that the switching system operator initializes data structures within the software block LOGEVENT by giving a command which sets up block-event-device combinations to be recorded. At 122 the subscriber makes a call as normal, i.e., subscriber A goes offhook. This event is relayed via a software signal to the LOGEVENT software block, and LOGEVENT checks its internal hash table to see if this event is to be recorded. If so, it is stored into the event buffer and saved for later retrieval.

Stored items of data include an event number, a time stamp, and up to 20 data which pertain to the event. Next, as subscriber A dials digits at 123, for each digit pressed, an event is relayed to the LOGEVENT software block. Information is recorded as to exactly which numbers were dialed, and as well as the relative time in between the dialing of each digit via the time stamp.

After completion of dialing, the subsequent software blocks involved in the call are identified by signals which pass back to LOGEVENT the dynamic individual numbers as they are allocated. When the call reaches the B subscriber at 124, the events of that subscriber, i.e., offhook, flash, onhook, etc. are also recorded at 125. As each of the register signaling components of the call are released at 126, i.e., the speech path of the call is set up, and software switching control is no longer needed, this information is also relayed to LOGEVENT so that those components will not be recorded on if used in a subsequent call. LOGEVENT removes the markings from its internal hash tables immediately upon receiving the "release" signals. When the final onhook signal is received from the B subscriber, LOGEVENT records the event, and removes from the hash tables the markings which would cause B to be recorded any further. Once the system operator has determined that the events of interest are complete, the recording is stopped at 127 and a printout is ordered to observe at 128 the sequence, timing, etc. of the events. If the sequence printed out shows abnormal behavior on the part of the switching system, or if the operator desires to replay the call exactly as it originally occurred, the events are downloaded to a PC and converted into a test script which is played back on a traffic generator as described above.

As can be seen, the system of the present invention enables the selective filtration and recording of events occurring within the telecommunication switch so that those events, including their sequence and timing, can be readily analyzed by an operator. If the events recorded have characteristically led to the occurrence of a fault within the switch, the analysis of the recorded events can be very constructive in writing the software modifications necessary to prevent the occurrence of such faults in the future. Once corrections to the software/hardware have been made to hopefully avoid the reoccurrence of a fault in response to certain events, the recorded events can be replayed through a call generator to simulate the occurrence of the same sequence and timing of events which had earlier resulted in the fault to determine whether or not the corrections to the software had the desired remedial effect.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of monitoring a telecommunication switch having internal events communicated between interacting, event driven blocks of software executed to control operation of the telecommunication switch, said method comprising the steps of:

defining the internal events desired to be monitored and parameters associated with the internal events desired to be monitored;

detecting internal events communicated between the blocks of software of said telecommunication switch;

filtering said detected internal events using said defined parameters associated with the defined internal events desired to be monitored; and recording the filtered, detected internal events and associated parameters.

2. The method as set forth in claim 1 wherein the defined parameters comprise parameters relating to a particular subscriber.

3. The method as set forth in claim 1 wherein the defined parameters comprise parameters relating to a particular component within said telecommunications switch.

4. The method as set forth in claim 1 further comprising the steps of:

downloading said recorded filtered, detected internal events and values of the parameters from the telecommunications switch; and reviewing said downloaded filtered, detected events for analyzing of internal events and parameters.

5. The method as set forth in claim 4 wherein said downloading step further comprises:

reconstructing from the filtered, detected internal events and values of the parameters an ordered sequence of occurrences of the filtered, detected internal events.

6. The method as set forth in claim 1 further comprising the steps of:

defining values for the defined parameters associated with the internal events desired to be monitored, said values being associated with normal operations of said telecommunication switch; and wherein the step of filtering comprises the step of comparing values for the detected parameters with the defined values.

7. The method as in claim 1 further comprising the steps of:

generating simulated telephone signals containing said recorded filtered, detected internal events and parameters; and transmitting said simulated telephone signals through said telecommunication for testing said switch.

8. The method as in claim 1 wherein said step of defining parameters associated with the internal events desired to be monitored further comprises the step of:

defining subscribers desired to be monitored; and wherein the step of filtering further comprises the step of filtering said detected internal events using the defined subscriber to record filtered, detected internal events concerning the defined subscriber.

9. A method of analyzing performance of a telecommunication switch whose operation is directed by the execution of interacting event driven blocks of software communicating internal events therebetween, said method comprising the steps of:

selecting a plurality of internal events of interest which may be communicated between the blocks of software;

modifying the blocks of software to report specified parameters associated with the communication of the selected internal events of interest;

selecting devices within said telecommunications switch as to which the selected plurality of internal events are of interest;

reporting the communication of internal events of interest and specified parameters;

filtering of the reported parameters using the selected devices; and recording the filtered, reported internal events and parameters.

10. The method as set forth in claim 9 further comprising the steps of:

selecting subscribers as one of the parameters of interest for the selected internal events; and wherein the step of filtering further includes the step of filtering the reported parameters using the selected subscriber parameters to record filtered, reported parameters concerning the selected subscriber.

11. The method as set forth in claim 11 further comprising the steps converting the filtered, recorded internal events parameters into playback script;

generating simulated calls with a call generator from said playback script; and directing said simulated calls through said telecommunications switch to test for the occurrence of faults within the blocks of software.

12. A system for monitoring a telecommunication switch having internal events communicated between interacting, event driven blocks of software executed to control operation of the telecommunication switch, said system comprising:

means for defining the internal events desired to be monitored and parameters associated with the internal events desired to be monitored;

means for detecting internal events communicated between the blocks of software of said telecommunication switch;

means for filtering said detected internal events using said defined parameters associated with the defined internal events desired to be monitored; and means for recording the filtered, detected internal events and associated parameters.

13. The system set forth in claim 12 wherein the defined parameters comprise parameters relating to a particular subscriber.

14. The system set forth in claim 12 wherein the defined parameters comprise parameters relating to a particular component within said telecommunications switch.

15. The system set forth in claim 12 further comprising:

means for downloading said recorded filtered, detected internal events and values of the parameters from the telecommunications switch; and means for reviewing said downloaded filtered, detected internal events for analyzing of internal events and parameters.

16. The system set forth in claim 15 further comprising:

means for reconstructing from the filtered, detected internal events and values of the parameters an ordered sequence of occurrences of the filtered, detected internal events.

17. The system set forth in claim 12 further comprising:

means for defining values for the defined parameters associated with the internal events desired to be monitored, said values being associated with normal operations of said telecommunication switch; and wherein the means for filtering comprises means for comparing values for the detected parameters with the defined values.

18. The system as in claim 12 further comprising:

means for generating simulated telephone signals containing said recorded filtered, detected internal events and parameters; and means for transmitting said simulated telephone signals through said telecommunication switch for testing said swtich.

19. The system as set forth in claim 12 wherein said means for defining further comprises:

means for defining subscribers desired to be monitored; and wherein the means for filtering further comprises means for filtering said detected internal events using the defined subscriber to record filtered, detected internal events concerning the defined subscriber.

20. A system for analyzing performance of a telecommunication switch whose operation is directed by the execution of interacting, event driven blocks of software communicating internal events therebetween, said system comprising:

means lot selecting a plurality of internal events of interest which may be communicated between the blocks of software;

means for modifying the blocks of software to report specified parameters associated with the communication of the selected internal events of interest;

means for selecting devices within said telecommunications switch as to which the selected plurality of internal events are of interest;

means for reporting the communication of internal events of interest and specified parameters;

means for filtering of the reported parameters using the selected devices; and means for recording the filtered, reported internal events and parameters.

21. The system set forth in claim 20 further comprising:

means for selecting subscribers as one of the parameters of interest for the selected internal events; and wherein the means for filtering further includes means for filtering the reported parameters using the selected subscriber parameters to record filtered, reported parameters concerning the selected subscriber.

22. The system set forth in claim 20 further comprising:

means for converting the filtered, recorded internal events and parameters into playback script;

means for generating simulated calls with a call generator from said playback script; and means for directing said simulated calls through said telecommunications switch to test for the occurrence of faults within the blocks of software.

23. A telecommunications switch, comprising:

a switching mechanism for performing call handling operations:

a plurality of interacting, event driven blocks of software executed to control the operation of the switching mechanism, certain ones of the blocks of software being programmed to generate software signals reporting internal events occurring within the telecommunications switch, said internal events communicated between the blocks of software;

an event filter for filtering the generated software signals to identify certain ones of the reported internal events as events of interest; and means for recording the events of interest.

24. The telecommunications switch as in claim 23 wherein each internal event includes a plurality of parameters associated with the internal events, the blocks of software reporting the parameters associated with the reported internal events, the event filter further filtering the software signals to identify certain parameters in the identified events of interest as parameters of interest.

25. In a telecommunications switch including a switching mechanism for performing call handling operations and a plurality of interacting, event driven blocks of software executing internal events to control the operation of the telecommunication swtich, a method for monitoring operation of the telecommunications switch comprising the steps of:

programming certain ones of the blocks of software to generate software signals reporting the communication of internal events occurring within the telecommunications switch and passing between the blocks of software;

filtering the generated software signals to identify certain ones of the reported internal events as events of interest; and recording the events of interest.

26. The method as in claim 25 wherein each internal event includes a plurality of parameters associated with the internal event, and wherein the blocks of software report the parameters associated with the reported internal events, the step of filtering further comprising the step of filtering the software signals to identify certain parameters in the identified events of interest as parameters of interest.

\* \* \* \* \*

UNITED STATES PATENT AND TRADEMARK OFFICE
CERTIFICATE OF CORRECTION

PATENT NO. : 5,488,648
DATED : January 30, 1996
INVENTOR(S) : Brian R. Womble

It is certified that error appears in the above-indentified patent and that said Letters Patent is hereby corrected as shown below:

Column 8, line 56  Replace "has"
With --hash--

Column 9, line 6  Replace "(T$)"
With --(TS)--

Column 10, line 2  Replace ""LI-I""
With --"LI-1"--

Column 11, line 5  Replace "INFV"
With --INDV--

Column 11, line 7  Replace "SNG"
With --SNB--

Column 11, line 12  Replace "SNG"
With --SNB--

Column 12, line 26  Replace ""2139075445""
With --"2149075445"--

Column 12, line 36  Replace "each"
With --Each--

UNITED STATES PATENT AND TRADEMARK OFFICE
CERTIFICATE OF CORRECTION

PATENT NO. : 5,488,648            Page 2 of 3
DATED     : January 30, 1996
INVENTOR(S) : Brian R. Womble It is certified that error appears in the above-indentified patent and that said Letters Patent is hereby corrected as shown below:

Column 16, line 14            After "detected"
Insert --internal--

Column 16, line 36            After "telecommunication"
Insert --switch--

Column 17, line 7            Replace "claim 11"
With --claim 9--

Column 17, line 8            After "steps"
Insert --of:--

Column 17, line 9            After "events"
Insert --and--

Column 17, line 67            Replace "swtich"
With --switch--

Column 18, line 13            Replace "lot"
With --for--

UNITED STATES PATENT AND TRADEMARK OFFICE
CERTIFICATE OF CORRECTION

PATENT NO. : 5,488,648
DATED : January 30, 1996
INVENTOR(S) : Brian R. Womble

It is certified that error appears in the above-indentified patent and that said Letters Patent is hereby corrected as shown below:

Column 19, line 3, replace "swtich" with --switch--

Signed and Sealed this

Twenty-fifth Day of June, 1996

*Attest:*

BRUCE LEHMAN

*Attesting Officer*     *Commissioner of Patents and Trademarks*